April 10, 1951  H. E. HOTZ ET AL  2,548,794
AIRCRAFT ENGINE COOLING SYSTEM
Filed April 8, 1948
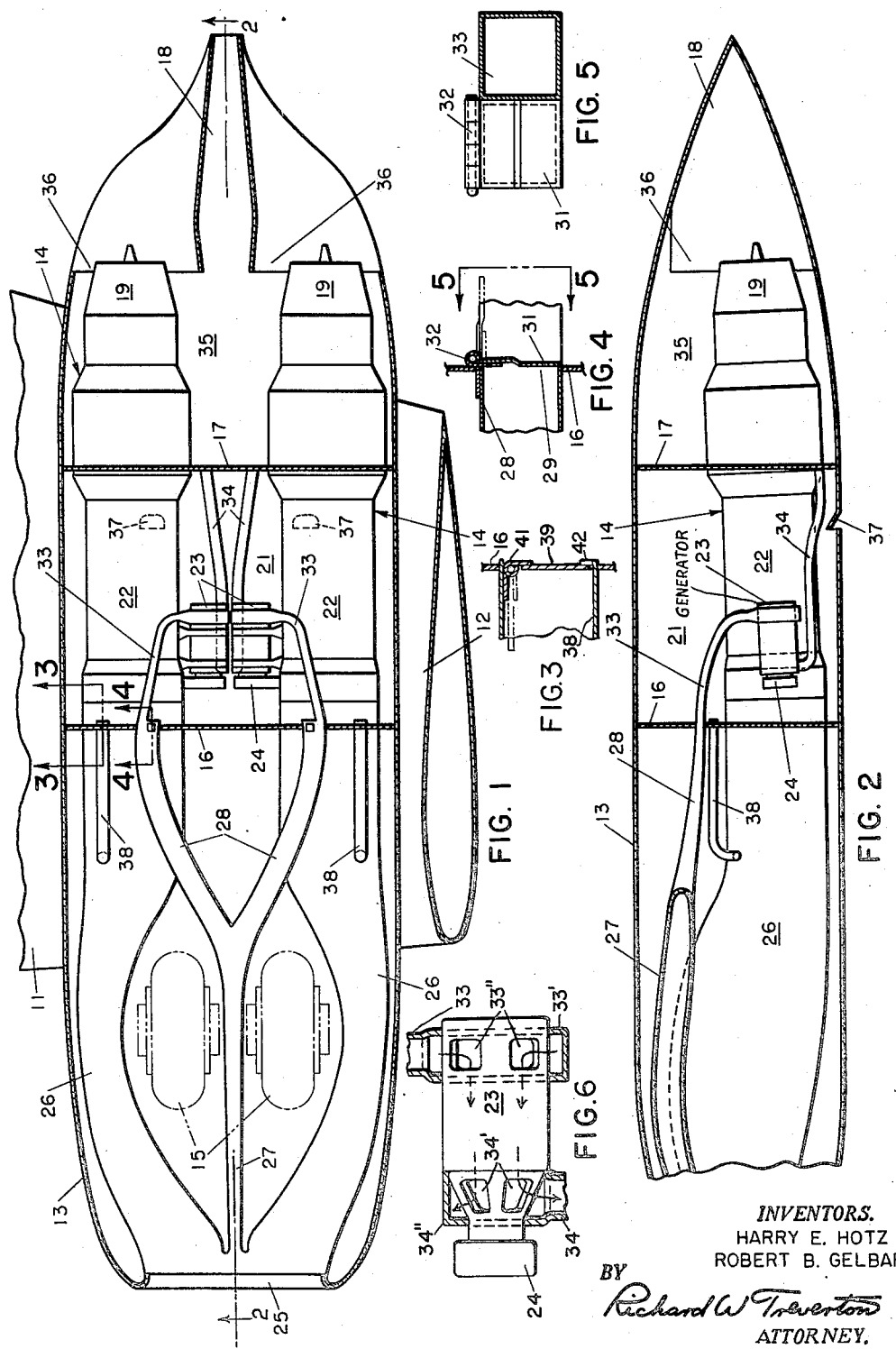
INVENTORS.
HARRY E. HOTZ
ROBERT B. GELBARD
BY Richard W Treverton
ATTORNEY.

Patented Apr. 10, 1951

2,548,794

UNITED STATES PATENT OFFICE 2,548,794

AIRCRAFT ENGINE COOLING SYSTEM

Harry E. Hotz and Robert B. Gelbard, Columbus, Ohio, assignors to Curtiss-Wright Corporation, a corporation of Delaware Application April 8, 1948, Serial No. 19,678

9 Claims. (Cl. 60—35.6)

1

The present invention relates to aircraft engine cooling and particularly to a system for cooling compartments containing a turbo-jet or similar engine and the accessories therefor.

An aircraft powered with an engine of this type usually flies at high speeds so that air under substantial ram pressure is available for diversion from the surrounding airstream and circulation as a coolant through compartments surrounding the engine and its accessories. However when the engine is operated with the aircraft on the ground, as during taxiing prior to takeoff or subsequent to landing, the ram pressure of the surrounding airstream is either negligible or non-existent, so that other means are required for circulating coolant air through the compartments in order to dissipate heat which otherwise would damage or interfere with proper functioning of engine components or accessories adjacent thereto.

The present invention contemplates a cooling system arranged to provide circulation of cooling air largely by ram air pressure while in flight operation, and, during ground operation, to utilize air flow through the engine itself for inducing circulation of the coolant air. Valve means are arranged in the system in such manner that the changeover from circulation by ram air pressure to circulation by engine induction, and vice versa, will take place automatically at the proper times. By this provision the pilot or flight engineer of the aircraft is relieved of responsibility for manually adjusting the cooling system to the different conditions required for flight and ground operation, and the aircraft is protected against the possibility of improper manual adjustment.

The foregoing and other objects and advantages will appear from the following description of the typical embodiment of the invention shown in the accompanying drawing, wherein:

Figure 1 is a plan sectional view, partly in section, of an aircraft engine nacelle containing a pair of turbo-jet engines;

Figure 2 is a longitudinal vertical section taken approximately along line 2—2 of Figure 1;

Figures 3 and 4 are sectional views taken along lines 3—3 and 4—4 respectively of Figure 1, to show details of the automatic valves employed in the system;

Figure 5 is a further detail view taken as indicated by section line 5—5 in Figure 4 and Fig. 6 is a detail view, partly in section, showing the means for providing airflow through an engine accessory.

In the illustrated embodiment an engine nacelle is mounted between the inner panel 11 and outer panel 12 of the airplane wing, the nacelle including an outer shell 13 for housing a pair of gas turbine or turbo-jet engines 14 and also, if desired, for housing landing wheels, indicated at 15, when the latter are retracted. It will be understood that the nacelle may be a part of the fuselage proper or wing proper of the aircraft, and that it may contain either one or any greater number of engines. Extending across the nacelle interior is a forward bulkhead 16 which defines the forward wall of the engine chamber, and an aft wall or bulkhead 17 which divides the engine chamber into fore and aft compartments. Tail fairing 18 of the nacelle provides a wall which separates the two jets of exhaust gases which during operation are emitted from the tail pipes 19 of the engines. The forward or accessory compartment 21 of the engine chamber between bulkheads 16 and 17 contains the compressor sections 22 of the turbo-jet engines and various engine accessories, including electric generators 23 which are driven by the engines through transmission means contained in housings 24, and also other accessories, not shown, such as fuel feeding devices.

The air passing through the engines enters the intake opening 25 in the front of the nacelle and is conducted to the engines through ducts 26. Air for cooling the compartment 21 passes from intake opening 25 through a smaller duct 27 having branches 28 which extend through the bulkhead 16. Each branch has an opening 29 into compartment 21, the opening being controlled by an air operated check valve 31 that is hinged at 32 to close by gravity in the absence of appreciable airflow from the ducts 27, 28 into the compartment 21. A further branch 33 of each duct branch 28 extends to a manifold 33' which encircles the rear portion of the casing of one generator 23 and overlies openings 33" in the casing for delivering cooling air to the generator interior, such air exhausting from openings 34' in the front of the generator casing. From these openings 34' the exhausting air passes into a manifold 34" that is provided on the front of the generator casing, and from this manifold it passes into an exhaust conduit 34 which discharges into the exhaust compartment 35 aft of bulkhead 17. The path of airflow through the generator is as shown by arrows in Fig. 6. This compartment may be considered to be a suction chamber inasmuch as the exhaust gas jet from tail pipes 19 entrains and draws air from it through the substantially circular openings 36 at the rear thereof.

Ports 37 formed in the bottom wall of shell 13 provide either inlets or outlets for cooling air, depending upon the operating conditions. Additional outlets for air from compartment 21 are provided by a pair of conduits 38 each of which extends through bulkhead 16 and discharges into one of the engine air intake ducts 26. Passage of air through each of conduits 38 is controlled by an air operated check valve 39 hinged at 41 to close by gravity. A stop 42 prevents the valve 39 from opening toward compartment 21, or to the right in Figure 3.

During ground running of the engine the compartment 21 is cooled by air entering through openings 37 and exhausting through outlet conduits 38 into engine air intake conduits 26. This flow takes place because of the sub-atmospheric static pressure prevailing in engine air intake ducts 26 due to the draft of air into the compressor section of the engine. At the initiation of such flow of cooling air through outlet conduits 38 the check valves 39 swing automatically to their open position, indicated in broken line in Figure 3, in which they remain for only so long as appreciable air flow continues in this direction. It will be seen that the air entering openings 37 adjacent the bottom aft portion of the engine compressor section and exhausting through conduits 38 adjacent the upper fore portion of the section will be forced to pass forwardly and upwardly around the engine section 22, thereby cooling the exterior walls of the engine and also of accessories mounted adjacent thereto.

During ground operation of the engines, when the air entering inlet 25 has no appreciable ram or pressure head, there will be no substantial tendency for air to flow from branch conduits 28 through openings 29, and accordingly gravity will retain the valves 31 closed. Accordingly a short circuited flow of air, entering through openings 29 and exhausting through conduits 38, is prevented. However due to the sub-atmospheric pressure maintaining in exhaust compartment 35, because of the entrainment of air into the jets issuing from tailpipes 19, air will continue to flow through duct 27 and its branches 33 into the casings of generators 23, exhausting from the latter through conduits 34 into compartment 35.

As the aircraft accelerates the ram pressure of air entering intake opening 25 will increase, with the result that at normal flying speeds the ram pressure in engine intake ducts 26, and in conduits 38 which are connected thereto, will be sufficiently greater than pressure within compartment 21 to hold check valve 39 closed and in abutment with stop 42. However air under ram pressure will enter compartment 21 via air duct 27, branches 28 and openings 29; the valves 31 being held open, in the position shown in broken lines in Figure 4, by the ram air pressure. The air will exhaust through ports 37 and, accordingly, is forced to pass as a coolant around the engine section 22 and the accessories mounted adjacent thereto as it traverses the interior of compartment 21. It will be noted that the path of this air is almost exactly the same, but in the opposite direction, to that which it follows during ground operation of the engine. During flight operation a portion of the ram air passing through ducts 27 will, of course, flow through duct extensions 33, generator housing 23 and exhaust conduits 34 into the low pressure zone comprising exhaust compartment 35. This provides circulation of cooling air through the latter compartment in which the temperatures are normally higher than in the accessory compartment 21.

It will be seen that the operation of the valves in the system may be entirely automatic, resulting from the different pressure encountered during ground and flight conditions, and that the pilot or flight engineer is thereby relieved of the necessity of manually adjusting the cooling system during the critical time periods when these conditions are changing.

It will be understood further that the system shown and described herein represents only one preferred form of the invention and that the inventive features involved may be otherwise embodied without departing from the spirit of the invention or from the scope of the appended claims.

We claim as our invention:

1. An aircraft having a gas turbine engine installed therein, said engine having a forward compressor section with an accessory mounted thereon and having an aft combustion section with a tailpipe for exhaust gases, the accessory being provided with a passage for cooling air; an engine air intake duct extending forwardly from the compressor section; a shell having an air intake opening in the nose thereof communicating with the forward end of said duct, said shell extending around said duct and engine and having bulkheads dividing its interior into a forward chamber surrounding said duct, an accessory compartment containing the compressor section of the engine, and an exhaust compartment containing the combustion section of the engine and having an opening to the atmosphere substantially surrounding said tailpipe and through which air may be drawn by the exhaust jet from said tailpipe; a duct for cooling air extending within the forward chamber for conducting air from said air intake opening to the forward end of the accessory compartment on one side of the engine; a check valve arranged to prevent air flow through the cooling air duct from the accessory compartment; a conduit providing for passage of air from the forward end of the accessory compartment on said one side of the engine into said air intake duct, a check valve arranged to prevent air flow through said conduit from said air intake duct; a port in said shell at the rear of said accessory compartment on the opposite side of the engine, said port serving as an inlet or as an outlet for cooling air flowing around said engine compressor section and said accessory depending upon which of said check valves is open; a branch from said cooling air duct connected to the inlet of said accessory passage, and a conduit connecting the outlet of said passage with said exhaust compartment.

2. An aircraft having a gas turbine engine installed therein, said engine having a forward compressor section with an accessory mounted adjacent thereto and having an aft combustion section with a tailpipe for exhaust gases, the accessory being provided with a passage for cooling air; a first duct for delivering ram air to the air inlet of the compressor section; a shell extending around the engine and having a bulkhead dividing its interior into an accessory compartment containing the compressor section of the engine and said accessory, and an exhaust compartment containing the combustion section of the engine and having an opening to the atmosphere substantially surrounding said tailpipe and through which air may be drawn by the exhaust jet from said tailpipe; a second duct for delivering ram air to the forward end of the accessory compartment on one side of the engine; a check valve arranged to prevent airflow through the second duct from the accessory compartment; a conduit providing for passage of air into said first duct from the forward end of the accessory compartment on said one side of the engine, a check valve arranged to prevent air flow through said conduit from said first duct; a port in said shell at the rear of said accessory compartment on the opposite side of the engine, said port serving as an inlet or as an outlet for cooling air flowing around said engine compressor section and said accessory depending upon which of said check valves is open; a branch from said cooling air duct connected to the inlet of said accessory passage, and a conduit connecting the outlet of said passage with said exhaust compartment.

3. An aircraft having a gas turbine engine installed therein; an accessory mounted adjacent the engine; a first duct for delivering ram air to the air inlet of the compressor section; a shell providing a compartment around said engine and containing said accessory; a second duct for delivering ram air to one end of said compartment on one side of the engine; an air operated check valve arranged to prevent airflow through the second duct from said compartment; a conduit providing for passage of air into said first duct from the said one end of said compartment on said one side of the engine, an air operated check valve arranged to prevent air flow through said conduit from said first duct; and a port at the opposite end of said compartment on the opposite side of the engine, said port serving as an inlet or as an outlet, for cooling air flowing around said engine and said accessory, depending upon which of said check valves is open.

4. An aircraft having an engine compartment; a gas turbine engine disposed in said compartment; a first passage for delivering ram air to the engine; a second passage for delivering ram air to one end of said compartment for cooling the latter, an air operated check valve arranged to prevent airflow through the second passage from the engine compartment; a conduit providing for passage of air from said one end of the engine compartment into said first passage, an air operated check valve arranged to prevent airflow through said conduit from said first passage; and a port in the wall of said compartment at the opposite end thereof, said port serving as an inlet or as an outlet for air depending upon which of said check valves is opened by air flow.

5. An aircraft having an engine accessory compartment and an exhaust compartment; a gas turbine engine having an accessory section in said accessory compartment and a tailpipe disposed in said exhaust compartment and discharging through an opening in the latter compartment to reduce the static pressure therein; an engine accessory in the accessory compartment provided with a passage for cooling air; a first passage for delivering ram air to the engine; a second passage for delivering ram air to one end of the accessory compartment for cooling the latter; a third passage including the cooling air passage in the accessory for delivering ram air to said exhaust compartment; an air operated check valve arranged to prevent airflow through the second passage from the accessory compartment; a conduit providing for passage of air from said one end of the accessory compartment, an air operated check valve arranged to prevent airflow through said conduit from said first passage; and a port in the wall of said accessory compartment at the opposite end thereof, said port serving as an inlet or as an outlet for air depending upon which of said check valves is opened by airflow.

6. An aircraft having a gas turbine engine installed therein, said engine having a forward compressor section with an accessory mounted adjacent thereto and having an aft combustion section with a tailpipe for exhaust gases, the accessory being provided with a passage for cooling air; a first duct for delivering ram air to the air inlet of the compressor section; a shell extending around the engine and having a bulkhead dividing its interior into an accessory compartment containing the compressor section of the engine and said accessory, and an exhaust compartment containing the combustion section of the engine and having an opening to the atmosphere substantially surrounding said tailpipe and through which air may be drawn by the exhaust jet from said tailpipe; a second duct for delivering ram air to the forward end of the accessory compartment on one side of the engine; a conduit providing for passage of air into said first duct from the forward end of the accessory compartment on said one side of the engine, a port in said shell at the rear of accessory compartment on the opposite side of the engine, said port serving as an inlet or as an outlet for cooling air flowing around said engine compressor section and said accessory depending upon whether said conduit or said second duct is in open communication with said accessory compartment; valve means for said conduit and said second duct for closing communication of one thereof with said accessory compartment when the other thereof is in open communication with said accessory compartment; a branch from said cooling air duct connected to the inlet of said accessory passage, and a conduit connecting the outlet of said passage with said exhaust compartment.

7. An aircraft having a gas turbine engine installed therein; an accessory mounted adjacent the engine; a first duct for delivering ram air to the air inlet of the engine; a shell providing a compartment around said engine and containing said accessory; a second duct for delivering ram air to one end of said compartment on one side of the engine; a conduit providing for passage of air into said first duct from the said one end of said compartment on said one side of the engine; a port at the opposite end of said compartment on the opposite side of the engine, said port serving as an inlet for cooling air flowing around said engine and said accessory to said conduit or as an outlet for cooling air flowing around said engine and said accessory from said second duct; and valve means for said conduit and said second duct for closing one thereof when the other thereof is open.

8. An aircraft having an engine compartment; a gas turbine engine disposed in said compartment; a first passage for delivering ram air to the engine; a second passage for delivering ram air to one end of said compartment for cooling the latter; a conduit providing for passage of air from said one end of the engine compartment into said first passage; a port in the wall of said compartment at the opposite end thereof, said port serving as an inlet for air flowing through said compartment to said conduit or as an outlet for air entering said compartment from said second passage; and valve means for said conduit and said second passage for closing one thereof when the other thereof is open.

9. An aircraft having a gas turbine engine installed therein, said engine having a forward compressor section with an accessory mounted thereon and having an aft combustion section with a tailpipe for exhaust gases, the accessory being provided with a passage for cooling air; an engine air intake duct extending forwardly from the compressor section; a shell having an air intake opening in the nose thereof communicating with the forward end of said duct, said shell extending around said duct and engine and having bulkheads dividing its interior into a forward chamber surrounding said duct, an accessory compartment containing the compressor section of the engine, and an exhaust compartment containing the combustion section of the engine and having an opening to the atmosphere substantially surrounding said tailpipe and through which air may be drawn by the exhaust jet from said tailpipe; means for conducting coolant air to and from said accessory compartment for circulation around said accessory; and means independent of said last mentioned means for conducting coolant air through said accessory passage, said independent means comprising a duct for cooling air extending within the forward chamber for conducting air from said air intake opening to one end of the accessory passage, and a conduit connecting the opposite end of said passage with said exhaust compartment, whereby airflow through said accessory passage may be induced by either or both of ram air pressure at said air intake opening and sub-atmospheric pressure within said exhaust compartment.

HARRY E. HOTZ.
ROBERT B. GELBARD.

REFERENCES CITED

The following references are of record in the file of this patent:

UNITED STATES PATENTS

| Number | Name | Date |
|---|---|---|
| 2,372,250 | Burnelli | Mar. 27, 1945 |
| 2,401,941 | Lee | June 11, 1946 |

FOREIGN PATENTS

| Number | Country | Date |
|---|---|---|
| 577,949 | Great Britain | June 6, 1946 |